US012738770B2

(12) United States Patent
Wu

(10) Patent No.: US 12,738,770 B2
(45) Date of Patent: Sep. 15, 2026

(54) ELECTRONIC DEVICE AND WIRELESS CHARGING METHOD

(71) Applicant: VIVO MOBILE COMMUNICATION CO., LTD., Guangdong (CN)

(72) Inventor: Zhiwen Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 287 days.

(21) Appl. No.: 18/516,811

(22) Filed: Nov. 21, 2023

(65) Prior Publication Data

US 2024/0088722 A1 Mar. 14, 2024

Related U.S. Application Data

(63) Continuation of application No. PCT/CN2022/094690, filed on May 24, 2022.

(30) Foreign Application Priority Data

May 24, 2021 (CN) ......................... 202110566747.3

(51) Int. Cl.

*H04M 1/02* (2006.01)
*H02J 50/10* (2016.01)
*H02J 50/40* (2016.01)

(52) U.S. Cl.

CPC ............ *H02J 50/402* (2020.01); *H02J 50/10* (2016.02); *H04M 1/0214* (2013.01)

(58) Field of Classification Search

CPC .......... H02J 50/10; H02J 50/402; H02J 50/40; H04M 1/02; H04M 1/0214; H04M 1/0243

See application file for complete search history.

(56) References Cited

U.S. PATENT DOCUMENTS 9,582,034 B2 2/2017 von Badinski et al.
10,206,474 B2 2/2019 Brzezinski et al.

(Continued)

FOREIGN PATENT DOCUMENTS

CN 103082624 A 5/2013
CN 111864914 A 10/2020
CN 112636483 A 4/2021

(Continued)

OTHER PUBLICATIONS

European Search Report for Application No. 22810549.0 mailed May 22, 2025, 9 pages.

(Continued)

*Primary Examiner* — Tuan H Nguyen

(74) *Attorney, Agent, or Firm* — BROOKS KUSHMAN P.C.

(57) ABSTRACT

An electronic device includes a first body, a second body, and charging coils. The charging coils include a first coil, a second coil, and a third coil. The first coil is disposed inside the first body of the electronic device, the second coil is disposed on a first side of the first body of the electronic device, and the third coil is disposed on a first side of the second body of the electronic device. In a case that a folding angle of the electronic device is greater than or equal to a preset angle, the second coil and the third coil work together for charging, and in a case that the folding angle of the electronic device is less than the preset angle, the first coil works for charging.

16 Claims, 7 Drawing Sheets

(56) References Cited

U.S. PATENT DOCUMENTS

2018/0090955 A1 3/2018 Graham et al.
2019/0235584 A1* 8/2019 Tenno .................. G06F 1/1683

FOREIGN PATENT DOCUMENTS

CN 113541324 A 10/2021
EP 3767776 A1 1/2021

OTHER PUBLICATIONS

International Search Report and Written Opinion for Application No. PCT /CN2022/094690, dated Jul. 27, 2022, 10 Pages.
First Indian Office Action for Indian Patent Application No. 202317085161 mailed Apr. 28, 2026. 7 pages.

* cited by examiner 900
901
Obtaining module
902
Charging module
Wireless charging apparatus

ELECTRONIC DEVICE AND WIRELESS CHARGING METHOD

CROSS-REFERENCE TO RELATED APPLICATIONS

This application is a continuation of International Application No. PCT/CN2022/094690 filed on May 24, 2022, which claims priority to Chinese Patent Application No. 202110566747.3, filed on May 24, 2021, which are incorporated herein by reference in their entireties.

TECHNICAL FIELD

This application pertains to the field of wireless charging technologies and specifically relates to an electronic device and a wireless charging method.

BACKGROUND

With the pursuit of larger screens, electronic devices nowadays are equipped with increasingly large screens. However, it is not convenient to carry electronic devices with large screens. The emergence of electronic devices with foldable screens allows users to enjoy the benefits of a large screen while maintaining portability.

Especially recently, with continuous development of folding technologies, an increasing quantity of electronic devices are equipped with foldable screens. Larger screens of such electronic devices lead to higher power consumption speed. Currently, wireless charging is being applied more widely. Wireless charging coils are integrated into electronic devices to implement wireless charging for the electronic devices through the wireless charging coils, making charging convenient.

However, during wireless charging, a folding state of a foldable electronic device is adjustable. When the electronic device is in different folding states, a position of a wireless charging coil relative to a transmitter coil inside the electronic device varies, and the wireless charging coil may even deviate from the transmitter coil, resulting in poor charging effect.

SUMMARY

According to a first aspect, an embodiment of this application provides a foldable electronic device, where the electronic device includes a first body, a second body, and charging coils, and the charging coils include a first coil, a second coil, and a third coil; and

- the first coil is disposed inside the first body of the electronic device, the second coil is disposed on a first side of the first body of the electronic device and spaced apart from the first coil, and the third coil is disposed on a first side of the second body of the electronic device; where
- in a case that the electronic device is unfolded, the first side of the first body fits with the first side of the second body; in a case that a folding angle of the electronic device is greater than or equal to a preset angle, the second coil and the third coil work together for charging; and in a case that the folding angle of the electronic device is less than the preset angle, the first coil works for charging.

According to a second aspect, an embodiment of this application provides a wireless charging method performed by a foldable electronic device, where the electronic device includes a first body, a second body, and charging coils, and the charging coils include a first coil, a second coil, and a third coil; the first coil is disposed inside the first body of the electronic device, the second coil is disposed on a first side of the first body of the electronic device and spaced apart from the first coil, and the third coil is disposed on a first side of the second body of the electronic device; and in a case that the electronic device is unfolded, the first side of the first body fits with the first side of the second body; where the method includes:

- obtaining a folding angle of the electronic device;
- in a case that the folding angle of the electronic device is less than a preset angle, controlling the first coil to work for charging; and
- in a case that the folding angle of the electronic device is greater than or equal to the preset angle, controlling the second coil and the third coil to work together for charging.

According to a third aspect, an embodiment of this application provides a wireless charging apparatus, where a foldable electronic device corresponding to the wireless charging apparatus includes a first body, a second body, and charging coils, and the charging coils include a first coil, a second coil, and a third coil; the first coil is disposed inside the first body of the electronic device, the second coil is disposed on a first side of the first body of the electronic device and spaced apart from the first coil, and the third coil is disposed on a first side of the second body of the electronic device; and in a case that the electronic device is unfolded, the first side of the first body fits with the first side of the second body; where the wireless charging apparatus includes:

- an obtaining module configured to obtain a folding angle of the electronic device; and
- a charging module configured to: in a case that the folding angle of the electronic device is less than a preset angle, control the first coil to work for charging; and
- in a case that the folding angle of the electronic device is greater than or equal to the preset angle, control the second coil and the third coil to work together for charging.

According to a fourth aspect, an embodiment of this application provides an electronic device, where the electronic device includes a processor, a memory, and a program or instructions stored in the memory and capable of running on the processor, and when the program or instructions are executed by the processor, the steps of the method according to the second aspect are implemented.

According to a fifth aspect, an embodiment of this application provides a readable storage medium, where the readable storage medium stores a program or instructions, and when the program or instructions are executed by a processor, the steps of the method according to the second aspect are implemented.

According to a sixth aspect, an embodiment of this application provides a chip, where the chip includes a processor and a communication interface, the communication interface is coupled to the processor, and the processor is configured to run a program or instructions so as to implement the method according to the second aspect.

According to a seventh aspect, an embodiment of this application provides a computer program product, where the program product is stored in a non-volatile storage medium, and the program product is executed by at least one processor so as to implement the method according to the second aspect.

According to an eighth aspect, an embodiment of this application provides an electronic device, where the electronic device is configured to perform the method according to the second aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms “first”, “second”, and the like in the specification and claims of this application are used to distinguish between similar objects rather than to describe a specific order or sequence. It should be understood that terms used in this way are interchangeable in appropriate circumstances such that the embodiments of this application can be implemented in an order other than those illustrated or described herein. In addition, “first” and “second” are typically used to distinguish objects of a same type and do not limit quantities of the objects. For example, there may be one or more first objects. In addition, “and/or” in the specification and claims represents at least one of connected objects, and the character “/” generally indicates that the contextually associated objects have an “or” relationship.

The following describes in detail the wireless charging method provided in the embodiments of this application through specific embodiments and application scenarios thereof with reference to the accompanying drawings.

Figure 1:
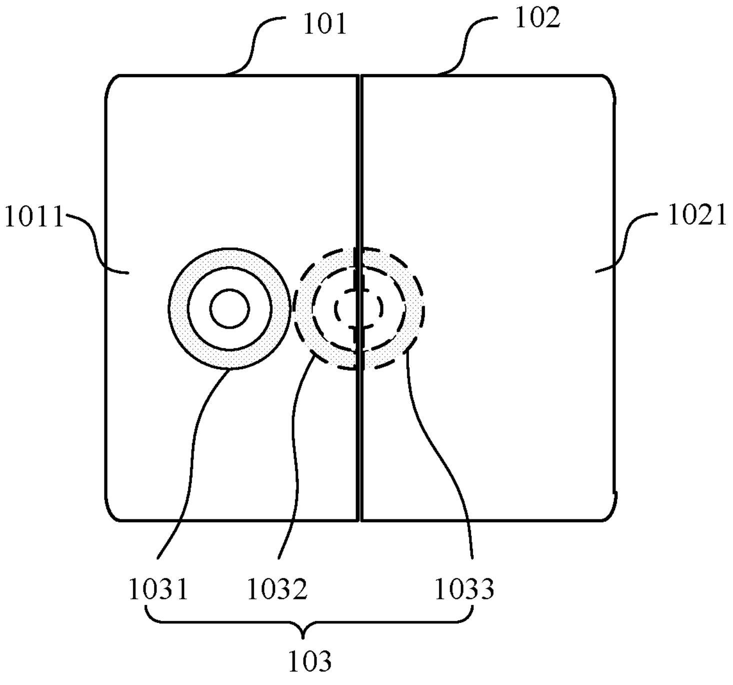
FIG. 1 is a first structural diagram of an electronic device according to an embodiment of this application.

As shown in FIG. 1, this application provides an embodiment of a foldable electronic device. The electronic device includes a first body 101, a second body 102, and charging coils. The charging coils include a first coil 1031, a second coil 1032, and a third coil 1033.

The first coil 1031 is disposed inside the first body 101 of the electronic device, the second coil 1032 is disposed on a first side of the first body 101 of the electronic device and spaced apart from the first coil 1031, and the third coil 1033 is disposed on a first side of the second body 102 of the electronic device.

In a case that the electronic device is unfolded, the first side of the first body 101 fits with the first side of the second body 102; in a case that a folding angle of the electronic device is greater than or equal to a preset angle, the second coil 1032 and the third coil 1033 work together for charging; and in a case that the folding angle of the electronic device is less than the preset angle, the first coil 1031 works for charging.

It should be noted that the electronic device being unfolded can be understood as the electronic device being fully unfolded, in which case the folding angle of the electronic device is 180°. In the case that the electronic device is unfolded, the first side of the first body 101 fits with the first side of the second body 102, the second coil 1032 is disposed on the first side of the first body 101, and the third coil 1033 is disposed on the first side of the second body 102. Therefore, in the case that the electronic device is unfolded, that is, in the case that the folding angle of the electronic device is 180°, the first side of the first body 101 fits with the first side of the second body 102.

It should be understood that the folding angle of the electronic device refers to an included angle between surfaces of the two bodies on which screens are provided. The preset angle may be an angle preset based on experience, for example, may be preset based on information such as screen size of the electronic device and proportions of screen sizes of a first screen 1011 and a second screen 1021 of the electronic device. In the case that the folding angle of the electronic device is less than the preset angle, which indicates that an unfolding angle of the foldable screen is small, that is, the electronic device is close to a folded state, the first coil 1031 can be used to charge the electronic device, where the first wireless charging coil senses a changing magnetic field generated by a transmitter coil to generate a voltage for charging the electronic device. In the case that the folding angle of the electronic device is greater than or equal to the preset angle, which indicates that an unfolding angle of the foldable screen is large, that is, the electronic device is close to an unfolded state, the second coil 1032 and the third coil 1033 can work together to charge the electronic device, where the second coil 1032 and the third coil 1033 sense a changing magnetic field generated by a transmitter coil in a transmitter base to generate a voltage for charging the electronic device.

The foldable electronic device in this embodiment of this application is provided with the first coil 1031, the second coil 1032, and the third coil 1033. In the electronic device, in a case that the folding angle is greater than or equal to the preset angle, the second coil 1032 and the third coil 1033 work together for charging; and in a case that the folding angle is less than the preset angle, the first coil 1031 works for charging. When the electronic device is provided with the first coil 1031, the second coil 1032, and the third coil 1033, a corresponding coil can be used for working based on a folding state of the electronic device to implement charging. Even though the folding angle of the electronic device can be adjusted and changed, a corresponding coil can be selected for charging based on the magnitude of the folding angle, instead of using a same charging coil for charging regardless of the folding state of the electronic device, thereby improving the charging effect.

In an embodiment, the first coil 1031 is located in a central region of the first body 101, and in a case that the folding angle of the electronic device is 180 degrees, a target coil formed by combination of the second coil 1032 and the third coil 1033 is located in a central region of a body formed by fitting of the first body 101 with the second body 102.

In this way, in a case that the electronic device is placed on a charger and charged by the second coil 1032 and the third coil 1033 working together, if the second coil 1032 and the third coil 1033 are opposite a transmitter coil in the charger, a central position of the electronic device can be opposite a central region of the charger without deviating from the central region, ensuring stable placement of the electronic device on the wireless charger for charging.

In an example, in the case that the folding angle of the electronic device is 180 degrees, the target coil formed by combination of the second coil 1032 and the third coil 1033 is a circular coil. In this way, in the case of fully unfolding of the electronic device, the second coil 1032 and the third coil 1033 can better sense the magnetic field of the transmitter coil, improving the sensing effect, and thereby improving the charging efficiency and the like.

In an embodiment, the target coil is a flexible coil, which means that the target coil can bend along with the folding and bending of the electronic device. In this case, the target coil can be a complete coil, and the second coil and the third coil can be considered as part of the target coil. This can reduce damage to the target coil caused by the folding and bending of the electronic device, thereby prolonging service life of the target coil.

Figure 2:
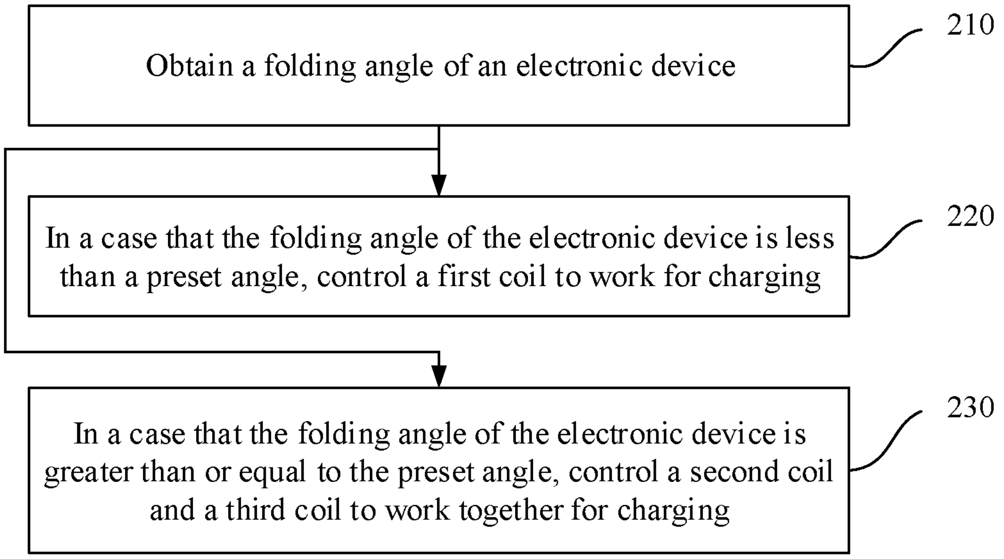
FIG. 2 is a first flowchart of a wireless charging method according to an embodiment of this application.

As shown in FIG. 2, this application provides an embodiment of a wireless charging method performed by a foldable electronic device. The electronic device includes a first body, a second body, and charging coils. The charging coils include a first coil, a second coil, and a third coil. The first coil is disposed inside the first body of the electronic device, the second coil is disposed on a first side of the first body of the electronic device and spaced apart from the first coil, and the third coil is disposed on a first side of the second body of the electronic device. In a case that the electronic device is unfolded, the first side of the first body fits with the first side of the second body.

The method includes the following steps.

Step 210. Obtain a folding angle of the electronic device.

The electronic device is a foldable device, and through rotation of at least one of the first body or the second body, the electronic device can be folded, and the folding angle of the foldable electronic device can be changed. A range of the folding angle is [0°, 180° ]. The folding angle being 0° indicates that the electronic device is in a fully folded state. The folding angle being 180° indicates that the electronic device is in a fully unfolded state, that is, in an unfolded state. The folding angle being between 0° and 180° indicates that the electronic device is in a partially unfolded state or a partially folded state. In the wireless charging method of this embodiment, the folding angle of the foldable electronic device can be obtained first. The folding angle of the electronic device can be detected in various manners, which is not limited in this embodiment. In addition, the folding angle can be detected in real time or at intervals of preset duration (for example, T, where T>0).

Step 220. In a case that the folding angle of the electronic device is less than a preset angle, control the first coil to work for charging.

The preset angle is an angle preset based on experience, for example, may be preset based on information such as screen size of the electronic device and proportions of screen sizes of a first screen and a second screen of the electronic device. In the case that the folding angle of the electronic device is less than the preset angle, which indicates that an unfolding angle of the foldable screen is small, the first coil can be controlled to work to charge the electronic device. In an example, the first coil can be connected to a battery of the electronic device, and the first coil senses a changing magnetic field to generate a voltage for charging the electronic device.

Step 230. In a case that the folding angle of the electronic device is greater than or equal to the preset angle, control the second coil and the third coil to work together for charging.

In the case that the folding angle of the electronic device is greater than or equal to the preset angle, which indicates that an unfolding angle of the foldable screen is large, the second coil and the third coil can work together to charge the electronic device, where the second coil and the third coil sense a changing magnetic field together to generate a voltage for charging the electronic device. In an example, the second coil and the third coil can be connected to a battery of the electronic device, and the second coil and the third coil work together to sense a changing magnetic field to generate a voltage for charging the battery of the electronic device.

In the wireless charging method of this embodiment, the electronic device is provided with the first coil, the second coil, and the third coil, and the folding angle of the electronic device can be obtained. In the case that the folding angle of the electronic device is less than the preset angle, the first coil works to charge the electronic device. In the case that the folding angle of the electronic device is greater than or equal to the preset angle, the second coil and the third coil work together to charge the electronic device. Even though the folding angle of the electronic device can be adjusted and changed, a corresponding coil can be selected for charging based on the magnitude of the folding angle, instead of using a same charging coil for charging regardless of the folding state of the electronic device, thereby improving the charging effect.

In an embodiment, after the controlling the first coil to work for charging or after the controlling the second coil and the third coil to work together for charging, the method further includes:

in a case that the electronic device is in a charging state and that a change in the folding angle of the electronic device from a first angle to a second angle is detected, controlling a candidate coil to work for charging and outputting prompt information, where the prompt information is used to prompt a user to move the electronic device along a target direction so that the candidate coil is aligned with a transmitter coil.

The candidate coil includes the second coil and the third coil, or the candidate coil is the first coil. The target direction is a direction from the second coil to the first coil or a direction from the first coil to the second coil.

The folding angle of the electronic device changing from the first angle to the second angle indicates that the folding angle of the electronic device in this case is the second angle. In a case that the folding angle changes, the prompt information can be output to prompt the user to move the electronic device. The user can move the electronic device according to the prompt information to bring the candidate coil close to the changing magnetic field generated by the transmitter coil in a wireless charger and aligned with the transmitter coil. This allows the candidate coil of the electronic device to more efficiently sense the changing magnetic field to charge the electronic device, thereby improving the wireless charging efficiency.

It should be noted that if the change in the folding angle of the electronic device from the first angle to the second angle is detected after the first coil is controlled to work for charging, the candidate coil includes the second coil and the third coil, and the target direction is the direction from the second coil to the first coil; and if the change in the folding angle of the electronic device from the first angle to the second angle is detected after the second coil and the third coil are controlled to work together for charging, the candidate coil includes the first coil, and the target direction is the direction from the first coil to the second coil.

In an embodiment, in a case that the first angle is less than the preset angle and that the second angle is greater than or equal to the preset angle, the prompt information is output, where the target direction is the direction from the second coil to the first coil; or in a case that the first angle is greater than or equal to the preset angle and that the second angle is less than the preset angle, the prompt information is output, where the target direction is the direction from the first coil to the second coil.

The folding angle of the electronic device changing from the first angle to the second angle indicates that the folding angle of the electronic device in this case is the second angle. If the first angle is less than the preset angle and the second angle is greater than or equal to the preset angle, it indicates that the electronic device changes from a relatively folded state to a relatively unfolded state. In this case, the prompt information can be output to prompt the user to move the electronic device along the target direction from the second coil to the first coil. The user can move the electronic device to bring the target coil formed by the second coil and the third coil close to the changing magnetic field generated by the transmitter coil in the wireless charger and aligned with the transmitter coil. This allows the second coil and the third coil of the electronic device to work together more efficiently to charge the electronic device, thereby improving the charging efficiency.

If the first angle is greater than or equal to the preset angle and that the second angle is less than the preset angle, it indicates that the electronic device changes from a relatively unfolded state to a relatively folded state. In this case, the prompt information can be output to prompt the user to move the electronic device along the target direction from the first coil to the second coil. The user can move the electronic device to bring the first coil close to the changing magnetic field generated by the transmitter coil in the wireless charger and aligned with the transmitter coil. This allows the first coil of the electronic device to work more efficiently to charge the electronic device, thereby improving the charging efficiency.

In an example, the prompt information may include a prompt image. The prompt image shows a current structural diagram of the simulated electronic device, the simulated first coil, the simulated second coil and third coil, and the target direction. The user can view the content of the prompt diagram and move the electronic device along the target direction, allowing the candidate coil of the electronic device to work more efficiently to charge the electronic device, and thereby improving the charging effect.

In an embodiment, the outputting prompt information includes:

in a case that a power difference between first received power and second received power is greater than or equal to a preset threshold, outputting the prompt information; where the first received power is received power for wireless charging of the electronic device in a case that the folding angle is the first angle, and the second received power is received power for wireless charging of the electronic device in a case that the folding angle is the second angle.

That is, in this embodiment, in addition to that the first angle and the second angle need to satisfy the above requirements, the received power also needs to satisfy the requirement. To be specific, in the case that the electronic device is in the charging state and that the change in the folding angle of the electronic device from the first angle to the second angle is detected, only when the power difference between the first received power and the second received power is greater than or equal to the preset threshold, the prompt information can be output to prompt the user to move the electronic device, allowing the electronic device to be more efficiently charged using a corresponding coil, reducing a frequency of switching between wireless charging coils during charging, and thereby improving the charging efficiency.

It should be noted that if the first angle is less than the preset angle and the second angle is greater than or equal to the preset angle, the preset threshold may be a first preset threshold; or if the first angle is greater than or equal to the preset angle and the second angle is less than the preset angle, the preset threshold may be a second preset threshold; where the first preset threshold and the second preset threshold may be different.

The following specifically describes the foregoing wireless charging method by using a specific embodiment. The foldable electronic device being a mobile terminal is used as an example for description, for example, a mobile phone, the mobile phone being a foldable mobile phone.

Figure 3:
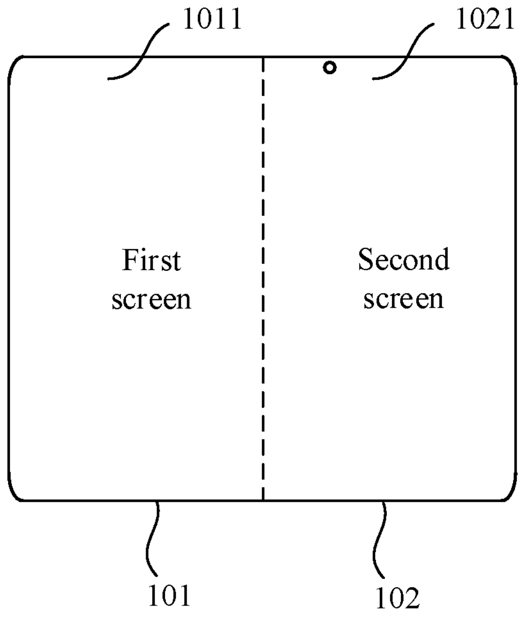
FIG. 3 is a second structural diagram of an electronic device according to an embodiment of this application.
Figure 4:
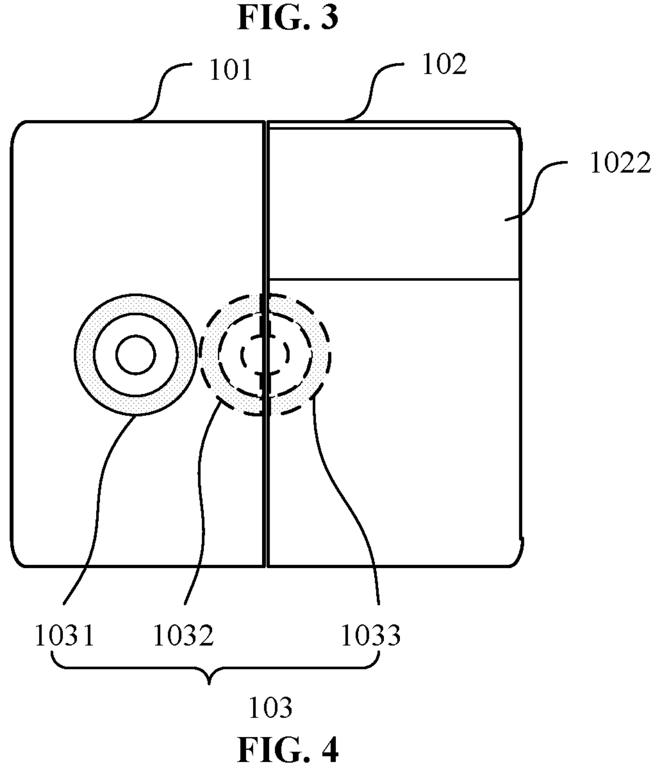
FIG. 4 is a third structural diagram of an electronic device according to an embodiment of this application.

As shown in FIGS. 3 and 4, the foldable electronic device includes a first body 101, a second body 102, and charging coils 103. The charging coils 103 include a first coil 1031, a second coil 1032, and a third coil 1033. The first coil 1031 is disposed inside the first body 101 of the electronic device, the second coil 1032 is disposed on a first side of the first body 101 of the electronic device and spaced apart from the first coil 1031, and the third coil 1033 is disposed on a first side of the second body 102 of the electronic device.

The first body 101 is provided with a first screen 1011, and the second body 102 is provided with a second screen 1021 and a third screen 1022 facing away from each other. The first screen 1011 and the second screen 1021 form a foldable front home screen of the electronic device, which can be folded along the middle rotation axis. The front home screen of the mobile phone being fully unfolded is shown in FIG. 3. The middle part of the front home screen is a foldable flexible screen. The foldable mobile phone can be placed horizontally or vertically, so its screen can be in landscape or portrait mode.

Figure 5:
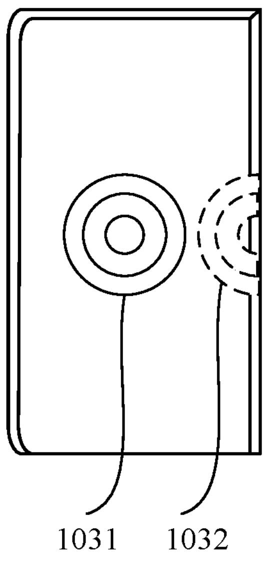
FIG. 5 is a fourth structural diagram of an electronic device according to an embodiment of this application.

FIG. 5 shows a structural diagram of the mobile phone in a fully folded state, where the first coil inside the first body may be located in a central region of the first body. When the mobile phone is in the fully folded state, the first screen 1011 and the second screen 1021 are completely folded, and content can be displayed on the third screen 1022. The third screen 1022 is a screen disposed on the back of the mobile phone. Spatial positions of the second coil and the third coil overlap in a direction perpendicular to the screen after folding.

Figure 6:
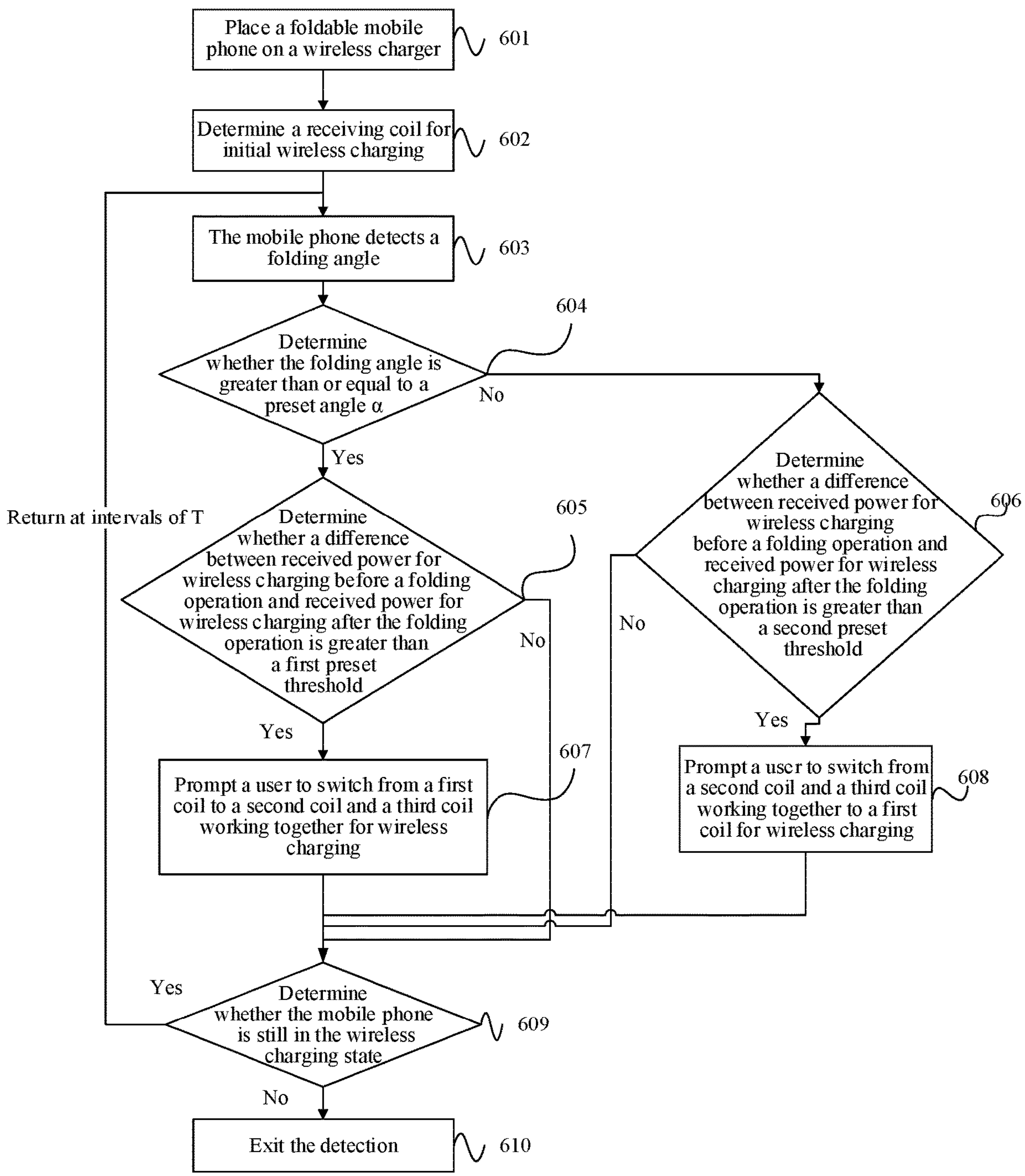
FIG. 6 is a second flowchart of a wireless charging method according to an embodiment of this application.

FIG. 6 is a schematic flowchart of the wireless charging method according to this embodiment. Specific steps are as follows.

Step 601. Place the foldable mobile phone on a wireless charger.

A transmitter base in the wireless charger may be placed vertically or horizontally.

Step 602. Determine a receiving coil for initial wireless charging.

For example, the foldable mobile phone detects an initial folding angle of the electronic device placed on the wireless charger to determine the initial receiving coil for wireless charging.

(1) The degree of folding of the mobile phone is represented by a folding angle $\beta$ between the first screen and the second screen, where larger $\beta$ indicates greater degree of unfolding;

in a case that the mobile phone is fully folded, $\beta=0°$;

in a case that the mobile phone is fully unfolded, $\beta=180°$; and in a case that the mobile phone is partially unfolded or partially folded, $0°<\beta<180°$.

(2) The folding angle $\beta$ is compared with a preset angle $\alpha$ for so as to select the receiving coil for initial wireless charging, where in a case that $\beta<\alpha$, the first coil inside the first body is selected as the receiving coil, that is, the first body of the electronic device can be directly opposite the transmitter coil of the wireless charger, and the first coil is used for wireless charging, that is, for detection and power transmission of wireless charging; and in a case that $\beta\geq\alpha$, the second coil and the third coil formed by two sections of coils together are selected as the receiving coil, that is, the target coil formed by the second coil and the third coil of the electronic device can be directly opposite the transmitter coil of the wireless charger, and the second coil and the third coil together are used for wireless charging.

Step 603. The mobile phone detects a folding angle.

For example, the folding angle is detected at intervals of preset duration T.

Step 604. Determine whether the folding angle is greater than or equal to the preset angle $\alpha$.

(1) After a preset duration T, a user may dynamically fold and unfold the screen, thus changing the degree of folding. It is assumed that a folding angle of the foldable screen for an initial state before user operation is a first angle $\beta$1, and a folding angle for an end state after the folding operation is a second angle $\beta$2.

(2) If $\beta1<\alpha\leq\beta2$, which means that the user makes the screen of the electronic device change from a relatively folded state to a relatively unfolded state, and that the folding angle $\beta$2 for the end state is greater than or equal to the preset angle $\alpha$, proceed to step 605.

(3) If $\beta2<\alpha\leq\beta1$, which means that the user makes the foldable screen change from a relatively unfolded state to a relatively folded state so that the target coil is separated from the wireless charger at a large included angle, and that the folding angle $\beta$2 for the end state is less than the preset threshold a, proceed to step 606.

Step 605: Determine whether a difference between received power for wireless charging before the folding operation and received power for wireless charging after the folding operation is greater than a first preset threshold.

It is assumed that during user operation of the electronic device, the corresponding received power for wireless charging at the first angle is first received power P1, the corresponding received power for wireless charging at the second angle for the end state after the folding operation is second received power P2, and the first preset threshold is $\Delta$P1. If $P1-P2\geq\Delta P1$, which means that it is necessary to prompt the user to switch to the second wireless charging coil for wireless power transmission, proceed to step 607. If $P1-P2<\Delta P1$, which means that switching is not needed because the power difference is low, proceed to step 609 to reduce the frequency of switching.

Step 606: Determine whether a difference between received power for wireless charging before the folding operation and received power for wireless charging after the folding operation is greater than a second preset threshold.

It is assumed that the corresponding received power for wireless charging at the first angle is first received power P1, the corresponding received power for wireless charging at the second angle for the end state after the folding operation is second received power P2, and the second preset threshold is $\Delta$P2. $\Delta$P1 and $\Delta$P2 are both thresholds for the difference between power before and after folding, with the difference lying in their values, as different power during folding or unfolding leads to different thresholds. If $P1-P2\geq\Delta P2$, which means that it is necessary to prompt the user to switch to the first wireless charging coil for wireless power transmission, proceed to step 608. If $P1-P2<\Delta P2$, which means that switching is not needed because the power difference is low, proceed to step 609.

Step 607: Prompt the user to switch from the first coil to the second coil and the third coil working together for wireless charging.

Figures 7, 8, 9:
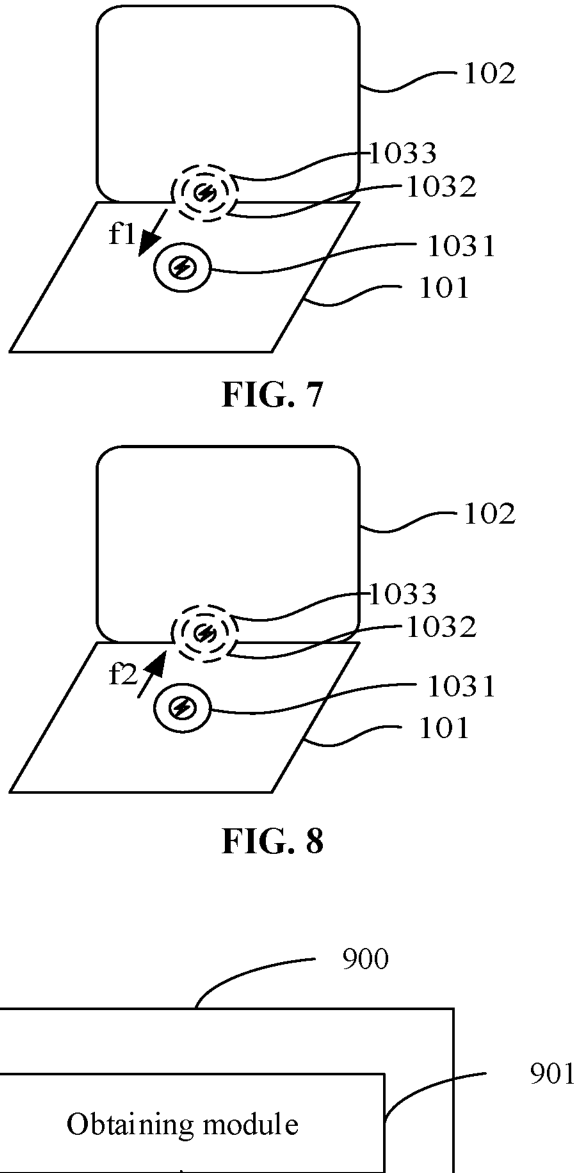
FIG. 7 is a schematic diagram illustrating a first prompt image in a display interface of an electronic device according to an embodiment of this application.
FIG. 8 is a schematic diagram illustrating a second prompt image in a display interface of an electronic device according to an embodiment of this application.
FIG. 9 is a schematic diagram of a wireless charging apparatus according to an embodiment of this application.

For example, as shown in FIG. 7, a first prompt image is displayed, where direction f1 is a first prompt direction for movement. In this case, a target direction is the first prompt direction for movement. After viewing the first prompt image, the user can move the mobile phone according to the prompt of direction f1 so that the mobile phone is charged by using the second coil and the third coil working together.

Step 608: Prompt the user to switch from the second coil and the third coil working together to the first coil for wireless charging.

For example, as shown in FIG. 8, a second prompt image is displayed, where direction f2 is a second prompt direction for movement. In this case, a target direction is the second prompt direction for movement. After viewing the second prompt image, the user can move the mobile phone according to the prompt of direction f2 so that the mobile phone is charged using the first coil.

Step 609: Determine whether the mobile phone is still in the wireless charging state.

If yes, return to step 603 at intervals of T.

If the mobile phone is not in the charging state, proceed to step 610 to exit the detection.

Step 610: Exit the detection. That is, exit the folding angle detection.

In this embodiment of this application, the user can obtain better experience of wireless charging during use of the foldable mobile phone in the unfolded state, and in a case that the folding angle changes, the user can be prompted and guided to move the electronic device to allow more efficient wireless charging by the wireless charging coil, thereby reducing unnecessary power loss and reducing heat generation while improving the charging efficiency. The electronic device in this embodiment of this application may be a mobile device, and the mobile device includes but is not limited to a mobile phone, a tablet computer, or a handheld device.

It should be noted that the wireless charging method according to this embodiment of this application may be executed by a wireless charging apparatus or a control module for executing the wireless charging method in the wireless charging apparatus. In the embodiments of this application, the wireless charging method being executed by the wireless charging apparatus is used as an example to describe the wireless charging apparatus according to the embodiments of this application.

As shown in FIG. 9, an embodiment of a wireless charging apparatus 900 is provided. A foldable electronic device corresponding to the wireless charging apparatus includes a first body, a second body, and charging coils. The charging coils include a first coil, a second coil, and a third coil. The first coil is disposed inside the first body of the electronic device, the second coil is disposed on a first side of the first body of the electronic device and spaced apart from the first coil, and the third coil is disposed on a first side of the second body of the electronic device. In a case that the electronic device is unfolded, the first side of the first body fits with the first side of the second body.

The wireless charging apparatus 900 includes:

an obtaining module 901 configured to obtain a folding angle of the electronic device; and a charging module 902 configured to: in a case that the folding angle of the electronic device is less than a preset angle, control the first coil to work for charging; and further configured to: in a case that the folding angle of the electronic device is greater than or equal to the preset angle, control the second coil and the third coil to work together for charging.

In an embodiment, the apparatus 900 further includes:

a processing module configured to: in a case that the electronic device is in a charging state and that a change in the folding angle of the electronic device from a first angle to a second angle is detected, control a candidate coil to work for charging and output prompt information, where the prompt information is used to prompt a user to move the electronic device along a target direction so that the candidate coil is aligned with a transmitting coil.

The candidate coil includes the second coil and the third coil, or the candidate coil is the first coil. The target direction is a direction from the second coil to the first coil or a direction from the first coil to the second coil.

In an embodiment, the outputting prompt information includes:

in a case that the first angle is less than the preset angle and that the second angle is greater than or equal to the preset angle, outputting the prompt information, where the target direction is the direction from the second coil to the first coil; or in a case that the first angle is greater than or equal to the preset angle and that the second angle is less than the preset angle, outputting the prompt information, where the target direction is the direction from the first coil to the second coil.

In an embodiment, the outputting prompt information includes:

in a case that a power difference between first received power and second received power is greater than or equal to a preset threshold, outputting the prompt information; where the first received power is received power for wireless charging of the electronic device in a case that the folding angle is the first angle, and the second received power is received power for wireless charging of the electronic device in a case that the folding angle is the second angle.

The wireless charging apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicular electronic device, a wearable device, an ultra-mobile personal computer (UMPC), a netbook, a personal digital assistant (PDA), or the like. The non-mobile electronic device may be a network attached storage (NAS), a personal computer (PC), a television (TV), a teller machine, a self-service machine, or the like. This is not specifically limited in the embodiments of this application.

The wireless charging apparatus in this embodiment of this application may be an apparatus having an operating system. The operating system may be an android operating system, may be an iOS operating system, or may be another possible operating system. This is not specifically limited in the embodiments of this application.

The wireless charging apparatus provided in this embodiment of this application can implement the processes implemented in the wireless charging method embodiments, for example, can implement the processes implemented in the method embodiments in FIG. 2 and FIG. 6. To avoid repetition, details are not described herein again.

Figure 10:
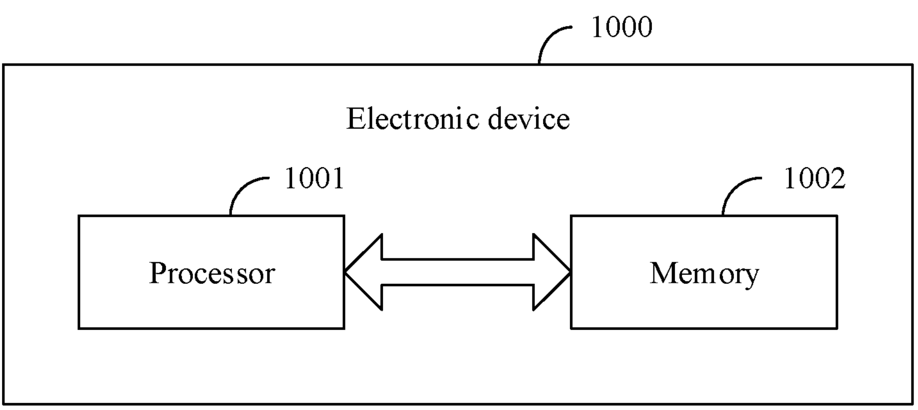
FIG. 10 is a schematic structural diagram of an electronic device according to an embodiment of this application.

Optionally, as shown in FIG. 10, an embodiment of this application further provides an electronic device 1000 including a processor 1001, a memory 1002, and a program or instructions stored in the memory 1002 and capable of running on the processor 1001, where when the program or instructions are executed by the processor 1001, the processes of the foregoing wireless charging method embodiments are implemented, with the same technical effects achieved. To avoid repetition, details are not described herein again.

It should be noted that the electronic device in this embodiment of this application includes the above-mentioned mobile electronic device and non-mobile electronic device.

Figure 11:
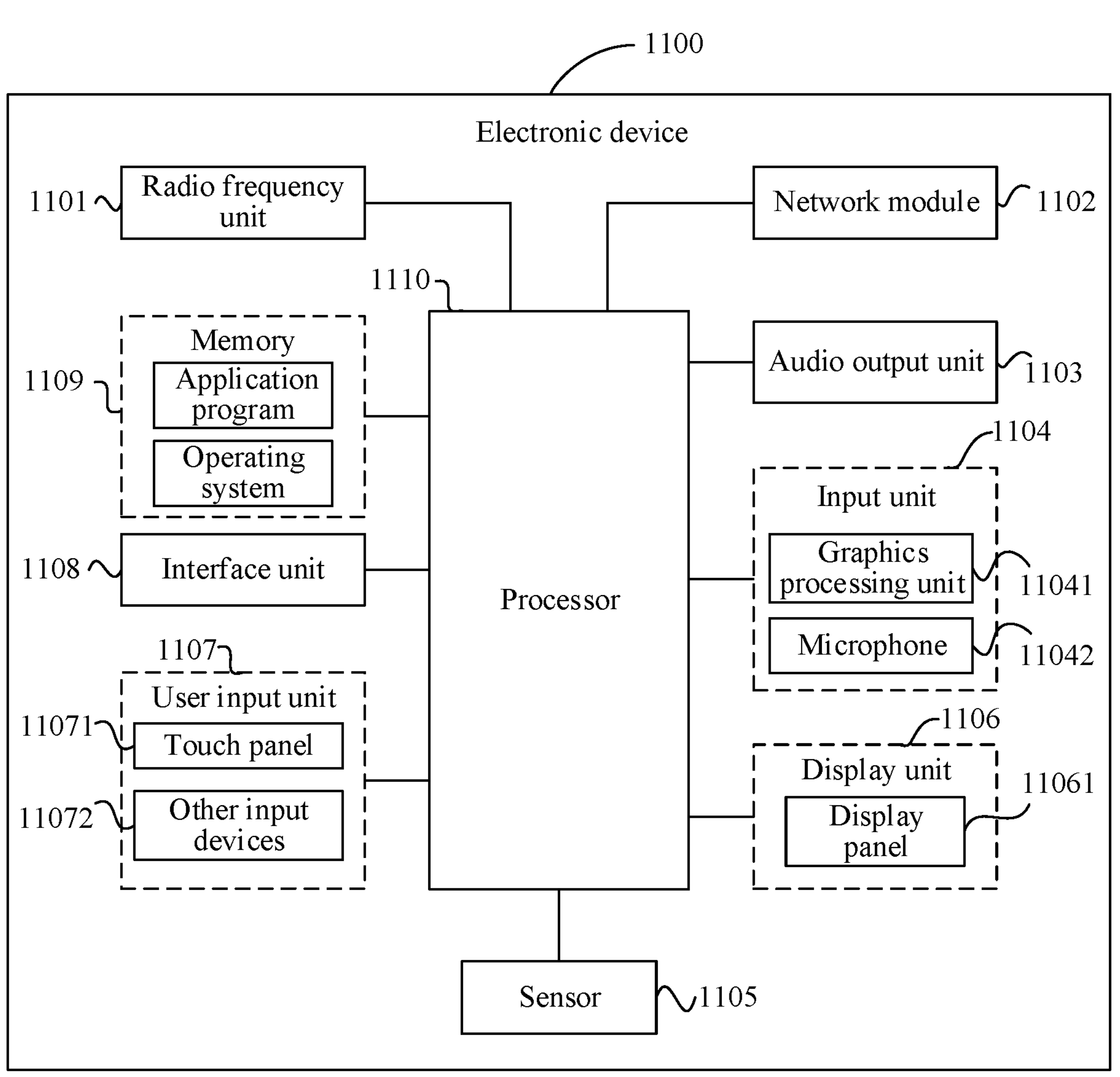
FIG. 11 is a schematic diagram of a hardware structure of an electronic device according to an embodiment of this application.

FIG. 11 is a schematic diagram of a hardware structure of an electronic device according to an embodiment of this application.

The electronic device 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

Those skilled in the art can understand that the electronic device 1100 may further include a power supply (for example, battery) that supplies power to various components. The power supply may be logically connected to the processor 1110 via a power management system, so that functions such as charge and discharge management and power consumption management are implemented via the power management system. The structure of the electronic device shown in FIG. 11 does not constitute a limitation on the electronic device. The electronic device may include more or fewer components than shown in the drawing, or combine some of the components, or arrange the components differently. Details are not described herein.

The electronic device includes a first body, a second body, and charging coils. The charging coils include a first coil, a second coil, and a third coil. The first coil is disposed inside the first body of the electronic device, the second coil is disposed on a first side of the first body of the electronic device and spaced apart from the first coil, and the third coil is disposed on a first side of the second body of the electronic device.

The processor 1110 is configured to: obtain a folding angle of the electronic device; in a case that the folding angle of the electronic device is less than a preset angle, control the first coil to work for charging; and in a case that the folding angle of the electronic device is greater than or equal to the preset angle, control the second coil and the third coil to work together for charging.

Optionally, the processor 1110 is configured to: in a case that the electronic device is in a charging state and that a change in the folding angle of the electronic device from a first angle to a second angle is detected, control a candidate coil to work for charging and output prompt information, where the prompt information is used to prompt a user to move the electronic device along a target direction so that the candidate coil is aligned with a transmitting coil.

The candidate coil includes the second coil and the third coil, or the candidate coil is the first coil. The target direction is a direction from the second coil to the first coil or a direction from the first coil to the second coil.

Optionally, the outputting prompt information includes:

in a case that the first angle is less than the preset angle and that the second angle is greater than or equal to the preset angle, outputting the prompt information, where the target direction is the direction from the second coil to the first coil; or in a case that the first angle is greater than or equal to the preset angle and that the second angle is less than the preset angle, outputting the prompt information, where the target direction is the direction from the first coil to the second coil.

Optionally, the outputting prompt information includes:

in a case that a power difference between first received power and second received power is greater than or equal to a preset threshold, outputting the prompt information; where the first received power is received power for wireless charging of the electronic device in a case that the folding angle is the first angle, and the second received power is received power for wireless charging of the electronic device in a case that the folding angle is the second angle.

It should be understood that in this embodiment of this application, the input unit 1104 may include a graphics processing unit (GPU) 11041 and a microphone 11042. The graphics processing unit 11041 processes image data of a static picture or a video that is obtained by an image capture apparatus (for example, a camera) in a video capture mode or an image capture mode. The display unit 1106 may include a display panel 11061. The display panel 11061 may be configured in a form of a liquid crystal display, an organic light-emitting diode display, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a function button (such as a volume control button or a power on/off button), a trackball, a mouse, and a joystick. Details are not described herein. The memory 1109 may be configured to store software programs and various data, including but not limited to application programs and operating systems. The processor 1110 may integrate an application processor and a modem processor. The application processor mainly processes an operating system, a user interface, an application program, and the like. The modem processor mainly processes wireless communication. It can be understood that the modem processor may alternatively be not integrated in the processor 1110.

An embodiment of this application further provides a readable storage medium, where the readable storage medium stores a program or instructions, and when the program or instructions are executed by a processor, the processes of the foregoing wireless charging method embodiments are implemented, with the same technical effects achieved. To avoid repetition, details are not described herein again.

The processor is the processor in the electronic device in the foregoing embodiments. The readable storage medium includes a computer-readable storage medium, for example, a computer read-only memory (ROM), a random access memory (RAM), a magnetic disk, or an optical disc.

An embodiment of this application further provides a computer program product, where the computer program product is stored in a non-transient readable storage medium, and the computer program product is executed by at least one processor so as to implement the processes of the foregoing wireless charging method embodiments, with the same technical effects achieved. To avoid repetition, details are not described herein again.

An embodiment of this application further provides a chip, where the chip includes a processor and a communication interface, the communication interface is coupled to the processor, and the processor is configured to run a program or instructions so as to implement the processes of the foregoing wireless charging method embodiments, with the same technical effects achieved. To avoid repetition, details are not described herein again.

It should be understood that the chip in the embodiments of this application may also be referred to as a system-level chip, a system chip, a chip system, a system on chip, or the like.

It should be noted that the terms “include”, “comprise”, or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement “includes a . . . ” does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application have been described above with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A foldable electronic device, wherein the electronic device comprises a first body, a second body, and charging coils for wireless charging the electronic device, and the charging coils comprise a first coil, a second coil, and a third coil, and an included angle between the first body and the second body is a folding angle of the electronic device; and the first coil is disposed inside the first body of the electronic device, the second coil is disposed on a first side of the first body of the electronic device and spaced apart from the first coil, and the third coil is disposed on a first side of the second body of the electronic device; wherein in a case that the electronic device is unfolded, the first side of the first body fits with the first side of the second body; in a case that the folding angle of the electronic device is greater than or equal to a preset angle, the second coil and the third coil work together for charging; and in a case that the folding angle of the electronic device is less than the preset angle, the first coil works for charging.

2. The electronic device according to claim 1, wherein the first coil is located in a central region of the first body, and in a case that the folding angle of the electronic device is 180 degrees, a target coil formed by combination of the second coil and the third coil is located in a central region of a body formed by fitting of the first body with the second body.

3. The electronic device according to claim 2, wherein the target coil is a flexible coil.

4. A wireless charging method performed by a foldable electronic device, wherein the electronic device comprises a first body, a second body, and charging coils for wireless charging the electronic device, and the charging coils comprise a first coil, a second coil, and a third coil, and an included angle between the first body and the second body is a folding angle of the electronic device; the first coil is disposed inside the first body of the electronic device, the second coil is disposed on a first side of the first body of the electronic device and spaced apart from the first coil, and the third coil is disposed on a first side of the second body of the electronic device; and in a case that the electronic device is unfolded, the first side of the first body fits with the first side of the second body; wherein the method comprises:

obtaining the folding angle of the electronic device;

in a case that the folding angle of the electronic device is less than a preset angle, controlling the first coil to work for charging; and in a case that the folding angle of the electronic device is greater than or equal to the preset angle, controlling the second coil and the third coil to work together for charging.

5. The method according to claim 4, wherein after the controlling the first coil to work for charging or after the controlling the second coil and the third coil to work together for charging, the method further comprises:

in a case that the electronic device is in a charging state and that a change in the folding angle of the electronic device from a first angle to a second angle is detected, controlling a candidate coil to work for charging and outputting prompt information, wherein the prompt information is used to prompt a user to move the electronic device along a target direction so that the candidate coil is aligned with a transmitter coil; wherein the candidate coil comprises the second coil and the third coil, or the candidate coil is the first coil; and the target direction is a direction from the second coil to the first coil or a direction from the first coil to the second coil.

6. The method according to claim 5, wherein the outputting prompt information comprises:

in a case that the first angle is less than the preset angle and that the second angle is greater than or equal to the preset angle, outputting the prompt information, wherein the target direction is the direction from the second coil to the first coil; or in a case that the first angle is greater than or equal to the preset angle and that the second angle is less than the preset angle, outputting the prompt information, wherein the target direction is the direction from the first coil to the second coil.

7. The method according to claim 5, wherein the outputting prompt information comprises:

in a case that a power difference between first received power and second received power is greater than or equal to a preset threshold, outputting the prompt information; wherein the first received power is received power for wireless charging of the electronic device in a case that the folding angle is the first angle, and the second received power is received power for wireless charging of the electronic device in a case that the folding angle is the second angle.

8. A non-transitory readable storage medium, wherein the non-transitory readable storage medium stores a program or instructions, and when the program or instructions are executed by a processor associated with an electronic device, the steps of the wireless charging method according to claim 4 are implemented.

9. The non-transitory readable storage medium according to claim 8, wherein after the controlling the first coil to work for charging or after the controlling the second coil and the third coil to work together for charging, the method further comprises:

in a case that the electronic device is in a charging state and that a change in the folding angle of the electronic device from a first angle to a second angle is detected, controlling a candidate coil to work for charging and outputting prompt information, wherein the prompt information is used to prompt a user to move the electronic device along a target direction so that the candidate coil is aligned with a transmitter coil; wherein the candidate coil comprises the second coil and the third coil, or the candidate coil is the first coil; and the target direction is a direction from the second coil to the first coil or a direction from the first coil to the second coil.

10. The non-transitory readable storage medium according to claim 9, wherein the outputting prompt information comprises:

in a case that the first angle is less than the preset angle and that the second angle is greater than or equal to the preset angle, outputting the prompt information, wherein the target direction is the direction from the second coil to the first coil; or in a case that the first angle is greater than or equal to the preset angle and that the second angle is less than the preset angle, outputting the prompt information, wherein the target direction is the direction from the first coil to the second coil.

11. The non-transitory readable storage medium according to claim 9, wherein the outputting prompt information comprises:

in a case that a power difference between first received power and second received power is greater than or equal to a preset threshold, outputting the prompt information; wherein the first received power is received power for wireless charging of the electronic device in a case that the folding angle is the first angle, and the second received power is received power for wireless charging of the electronic device in a case that the folding angle is the second angle.

12. A chip, comprising a processor and a communication interface, wherein the communication interface is coupled to the processor, and the processor is configured to run a program or instructions so as to implement the wireless charging method according to claim 4.

13. An electronic device, comprising a processor, a memory, and a program or instructions stored in the memory and capable of running on the processor, wherein the electronic device further comprises a first body, a second body, and charging coils for wireless charging the electronic device, and the charging coils comprise a first coil, a second coil, and a third coil, and an included angle between the first body and the second body is a folding angle of the electronic device; the first coil is disposed inside the first body of the electronic device, the second coil is disposed on a first side of the first body of the electronic device and spaced apart from the first coil, and the third coil is disposed on a first side of the second body of the electronic device; and in a case that the electronic device is unfolded, the first side of the first body fits with the first side of the second body; wherein the program or instructions, when executed by the processor, cause the electronic device to implement:

obtaining the folding angle of the electronic device; and in a case that the folding angle of the electronic device is less than a preset angle, controlling the first coil to work for charging; and in a case that the folding angle of the electronic device is greater than or equal to the preset angle, controlling the second coil and the third coil to work together for charging.

14. The electronic device according to claim 13, wherein the program or instructions, when executed by the processor, further cause the electronic device to implement:

in a case that the electronic device is in a charging state and that a change in the folding angle of the electronic device from a first angle to a second angle is detected, controlling a candidate coil to work for charging and outputting prompt information, wherein the prompt information is used to prompt a user to move the electronic device along a target direction so that the candidate coil is aligned with a transmitting coil; wherein the candidate coil comprises the second coil and the third coil, or the candidate coil is the first coil; and the target direction is a direction from the second coil to the first coil or a direction from the first coil to the second coil.

15. The electronic device according to claim 14, wherein the outputting prompt information comprises:

in a case that the first angle is less than the preset angle and that the second angle is greater than or equal to the preset angle, outputting the prompt information, wherein the target direction is the direction from the second coil to the first coil; or in a case that the first angle is greater than or equal to the preset angle and that the second angle is less than the preset angle, outputting the prompt information, wherein the target direction is the direction from the first coil to the second coil.

16. The electronic device according to claim 14, wherein the outputting prompt information comprises:

in a case that a power difference between first received power and second received power is greater than or equal to a preset threshold, outputting the prompt information; wherein the first received power is received power for wireless charging of the electronic device in a case that the folding angle is the first angle, and the second received power is received power for wireless charging of the electronic device in a case that the folding angle is the second angle.

* * * * *